(12) United States Patent
Valentin et al.

(10) Patent No.: US 7,007,150 B2
(45) Date of Patent: Feb. 28, 2006

(54) MEMORY BALANCING AND OPTIMIZATION SERVICES

(75) Inventors: Gary Valentin, Toronto (CA); Paul M. Bird, Markham (CA); Matthew A Huras, Ajax (CA); Xun Xue, Scarborough (CA)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 10/401,329

(22) Filed: Mar. 27, 2003

(65) Prior Publication Data

US 2003/0196062 A1 Oct. 16, 2003

(30) Foreign Application Priority Data

Apr. 12, 2002 (CA) .................................. 2382718

(51) Int. Cl.
*G06F 12/00* (2006.01)
(52) U.S. Cl. ....................................... 711/170; 711/147
(58) Field of Classification Search ........ 711/170–172, 711/147–153
See application file for complete search history.

(56) References Cited

U.S. PATENT DOCUMENTS

| | | | |
|---|---|---|---|
| 5,809,554 A | * | 9/1998 | Benayon et al. ............ 711/171 |
| 5,999,272 A | | 12/1999 | Dow et al. |
| 6,298,422 B1 | * | 10/2001 | Spilo et al. ................. 711/154 |
| 6,453,404 B1 | * | 9/2002 | Bereznyi et al. ............ 711/171 |
| 6,816,956 B1 | * | 11/2004 | Benayon et al. ............ 711/170 |

FOREIGN PATENT DOCUMENTS

| | | |
|---|---|---|
| EP | 0374337 A1 | 6/1990 |
| EP | 0547992 A2 | 6/1993 |

* cited by examiner

*Primary Examiner*—Matthew D. Anderson
(74) *Attorney, Agent, or Firm*—Cathrine K. Kinslow; Jeffrey S. LaBaw

(57) ABSTRACT

Memory balancing and optimization services (MBOS) control a size of a plurality of memory heaps, and a memory optimizer for allocating and de-allocating memory for a plurality of respective memory consumers. The MBOS may be instantiated within an application program such as a database management system providing services to memory consumers within the application. Alternatively, the MBOS may be instantiated within an operating system for providing services to memory consumers that are applications such as database management systems, e-commerce engines, operating systems, customer relationship management (CRM), enterprise resource planning (ERP), or supply chain management (SCM). Alternatively, an MBOS is instantiated within the operating system to provide services to applications and an MBOS is instantiated within each application to provide services to memory consumers within the application.

20 Claims, 8 Drawing Sheets

MEMORY BALANCING AND OPTIMIZATION SERVICES

CROSS-REFERENCE TO RELATED APPLICATIONS

This is the first application filed for the present invention.

1. Technical Field

The present invention relates to improved memory management in a computing environment and, in particular, to inter-application and intra-application services for memory usage balancing and optimization.

2. Background of the Invention

In a computer system, large applications use memory in many different ways. They include sorting, caching prior work, scratch pad computations, concurrency control information, data caching, etc. Any of these requirements for memory may exceed a computer system's available memory capacity. Furthermore, memory usage is not static or generally optimized. Requirements and priorities among applications that consume memory change over time. One component of an application may benefit more from available memory than another component. Similarly, one application may hoard memory or benefit more from available memory than another.

In some systems, memory usage may be controlled, to an extent, directly by a user, as, for example, taught in U.S. Pat. No. 5,809,554 to Benayon et al. The user may configure memory consumption patterns used by an application while it executes. In some systems, memory usage may also be controlled indirectly by the user. In addition, workload on the application and user configurations may alter or control the memory consumption of various application components.

Several issues remain inadequately addressed or unaddressed by prior art memory management systems, however. For example, an application may be able to benefit from using more memory if the memory were made available to the application. The application may also be required to scale back memory usage when memory is constrained on the system.

In some cases, emergency shared memory is required by one or more components of an application in order to complete a task. This indicates a requirement for memory overflow (temporary over configuration) compensation.

The requirements set out above must be solved in unison, since they are highly interdependent.

There therefore remains a need for memory balancing and optimization services that can pass memory from one memory consumer to another, and permit dynamic reconfiguration of memory allocations to improve memory usage.

SUMMARY OF THE INVENTION

It is therefore an object of the invention to provide a method and system for memory balancing and optimization services that balance memory use among memory consumers, and permit dynamic reconfiguration of memory allocations.

The invention therefore provides a system for balancing and optimizing memory allocation in a computer system that supports a plurality of memory consumers. The system includes a centralized control function, referred to as a Memory Balancing and Optimization System (MBOS). The MBOS is adapted to serve memory reconfiguration requests received from any one of: selected ones of the memory consumers, a memory optimizer, and a system administrator. Callback functions are associated with memory used by at least the selected ones of the memory consumers. The callback functions are adapted to increase or reduce memory usage by an associated memory consumer under control of the MBOS.

The invention also provides a method of balancing and optimizing memory allocation in a computer system having an operating system, system memory and a plurality of memory consumers that compete for use of the system memory. The method comprises a first computer-implemented step of issuing a request from a memory consumer when a block of system memory is required. The request is sent to an application programming interface (API) of a memory balancing and optimization services (MBOS) application instantiated on the computer system. A request is issued by the MBOS to the operating system to get the block of memory. If the request is unsuccessful, a request is issued from the MBOS to a callback function associated with a memory heap used by the memory consumer to get the block of memory. If that is unsuccessful, a request is issued from the MBOS to respective callback functions of other memory consumers in a predefined set, to determine whether a memory block can be obtained from another member of the set.

The invention also provides method comprising a first computer-implemented step of receiving, at a an application programming interface (API) of a memory balancing and optimization services (MBOS) application instantiated on the computer system, instructions to reconfigure memory usage by one of the memory consumers. On receiving the instructions, the MBOS obtains a memory grow_heap latch associated with a memory heap used by the memory consumer. The MBOS then determines whether the memory usage is being reduced or increased, and instructs the callback function associated with the memory heap to release or add memory to the memory heap in accordance with the reconfiguration instructions.

The invention further provides a memory balancing and optimization services (MBOS) system for a computer system having a system memory, an operating system that executes within the system memory and a plurality of memory consumers that compete for use of the system memory. The system comprises a callback function associated with a memory heap used by at least selected ones of the memory consumers and the MBOS that includes an application program interface (API) for accepting memory usage information and memory allocation request messages from the memory consumers, the MBOS being adapted to send memory configuration messages to the respective callback functions to control a size of the respective memory heaps.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

The invention provides a system for balancing and optimizing memory allocation in a computer system that supports a plurality of memory consumers. The system includes a centralized control function, referred to as a Memory Balancing and Optimization System (MBOS). The MBOS is adapted to serve memory reconfiguration requests received from any one of: selected ones of the memory consumers, a memory optimizer, and a system administrator. A callback function is are associated with a memory heap used by each of the selected ones of the memory consumers. The callback function is adapted to increase or reduce memory in the memory heap associated with the memory consumer, under control of the MBOS.

Figure 1:
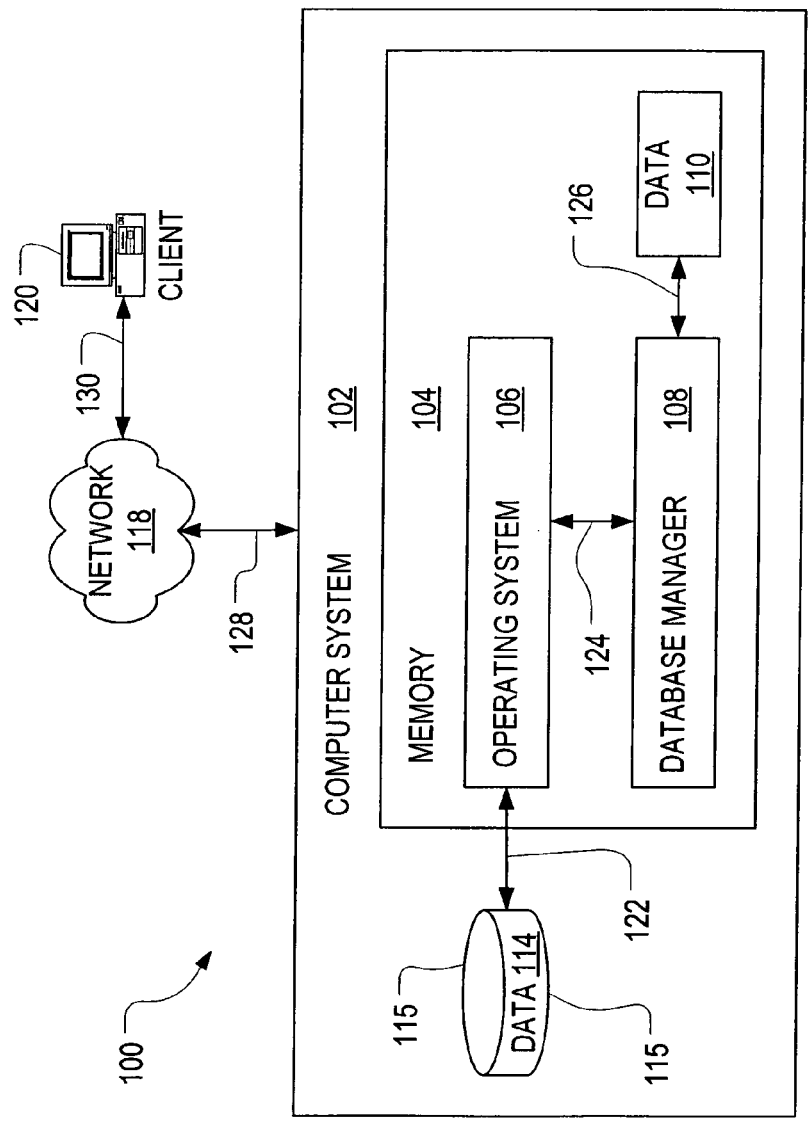
FIG. 1 is a block diagram of a computer system, network and client.

FIG. 1 is a block diagram 100 of a prior art computer system 102 connected to a network 118. A plurality of client computers 120 (only one of which is shown) are connected via links 130 to the network 118 in a manner well known in the art. The computer system 102 has a memory 104 such as semiconductor random access memory (RAM), flash memory, or the like. An operating system (OS) 106 such as AIX, Linux, OS X, Windows 2000, Windows XP or the like resides in the memory 104. A plurality of applications (only one shown) such as a database manager 108, web-server application server, e-commerce engine, customer relationship management (CRM), enterprise resource planning (ERP), or supply chain management (SCM) software are communicatively coupled by an interface 124 to the operating system 106. The database manager 108 stores and retrieves data 110 stored in the memory 104 using an interface 126 and communicates with the OS 106 via the interface 124 to access data 114 stored on a non-volatile medium such as a hard disk 115. The OS 106 retrieves the data 114 via a bus 122 in a manner well known in the art. The computer system 102 is connected to a network 118 by a link 128, also in a manner well known in the art.

Figure 2:
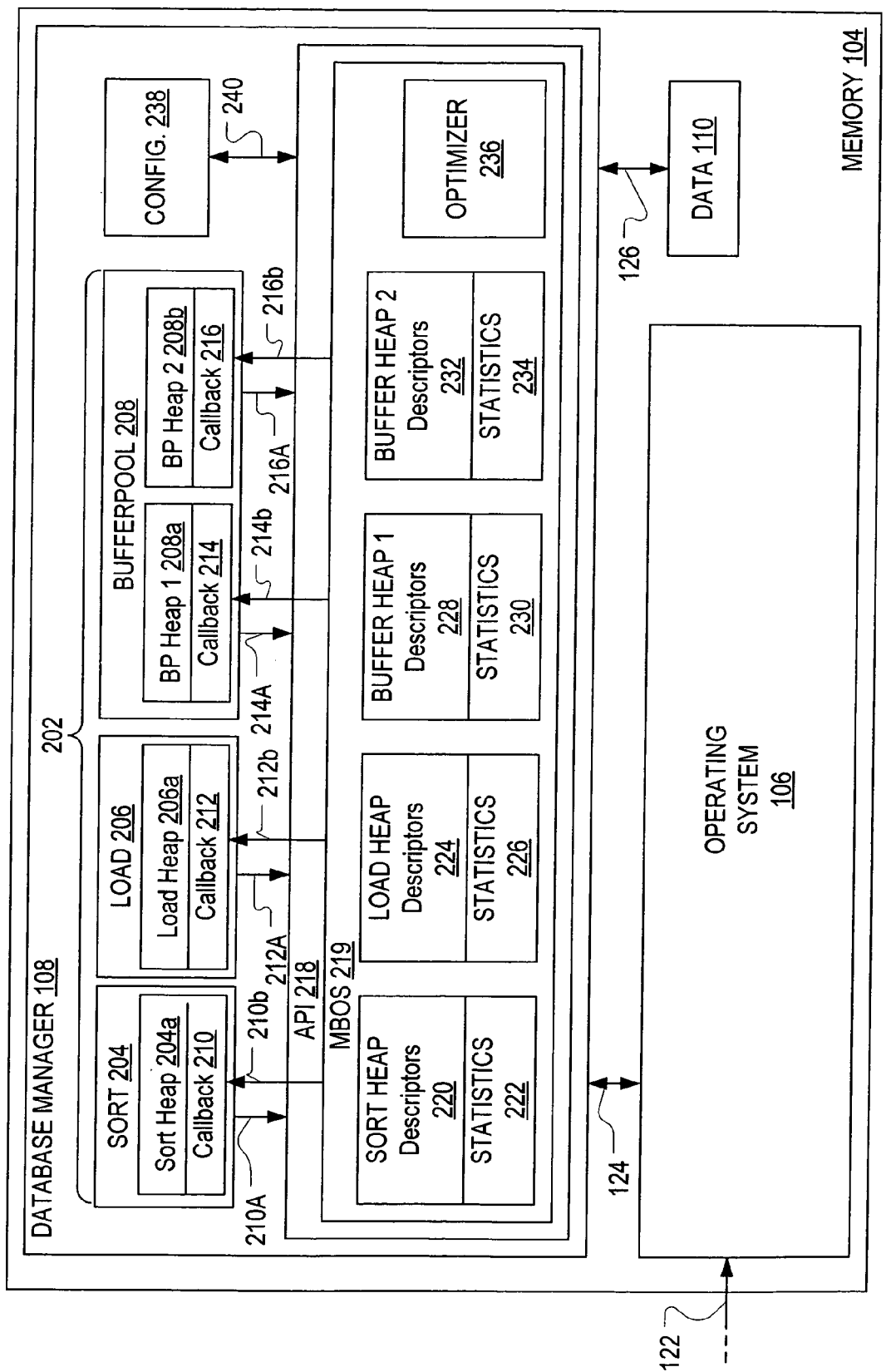
FIG. 2 is a block diagram of an embodiment of the invention.

FIG. 2 is a schematic diagram of the memory 104 shown in FIG. 1 configured in accordance with one implementation of the memory management services in accordance with the invention. As is well known in the art, the database manager application 108 includes a plurality of application components 204, 206, 208. Certain of the application components are dynamic memory consumers 202. Only three of the dynamic memory consumers 202 are shown for the sake of illustration. Those three memory consumers 202 are sort 204, load 206, and buffer-pool 208. The respective components maintain one or more memory heaps, respectively the sort heap 204A, the load heap 206A, and the first and second buffer-pool heaps 208A, 208B. As is well known in the art, a memory heap is an area of memory reserved for data that is retrieved, stored or created at run time. In accordance with the invention, each of the memory consumers 202 is further provided with a callback function 210–216 that is used by a memory balance and optimization service (MBOS) 219 to dynamically control a size of the respective memory heaps, as will be described below in detail.

For the purposes of schematic illustration, MBOS 219 is shown as a discrete component of the memory balancing and optimization services architecture in accordance with the invention. It should be understood, however, that the MBOS 219 includes an application programming interface (API) 218 and the callback functions 210–216 associated with the respective application components 204–208. The MBOS 219 may be implemented, for example, with six principal components:

The API 218, which is a set of functions that can be called by any memory consumer 202 to request a change to memory distribution. The API 218 can be called, for example, by any application component's overflow mechanism, or on behalf of a user-directed reconfiguration effected by changing configuration parameters 238. The API 218 can also be called by a memory use optimization engine that computes a new memory use configuration for memory 104.

The component callback functions 210–216, which are a set of functions that are implemented on a one-per-application component 204–208, or a memory consumer, basis. The component callback functions support dynamic memory consumption and are structured to inspect memory use by the memory consumer 202 in order to release unused memory on request from the MBOS 219. The component callback functions can also be used by MBOS 219 to increase memory available for use by the memory consumer 202 in instances where the memory consumer 202 requires or is allocated additional memory.

Central callback functions, which are a part of the MBOS 219 logic, are called when the system memory is constrained or released. These functions change rules for memory allocation patterns to reduce memory use requirements when system memory is constrained. These functions are also called when memory becomes available.

Memory usage tracking and optional memory statistics, which are functions in the MBOS 219 logic that track memory usage and, optionally, analyze memory use to provide a statistical analysis of memory usage behavior.

An optional memory optimizer, which is an engine that observes memory usage and solves the classical knapsack problem, well known in the art, to determine an improved (or near-optimal) usage configuration for memory 104.

A passive memory redistributor, which is logic written to release memory from a list of memory consumers to make new memory available as required. The passive memory redistribution logic is preferably instantiated to ensure that all applications and/or application components are ensured a fair share of memory 104.

In a context of an application, memory consumers can generally be categorized into one of the following three types:

Pools, which are logical memory allocations of fixed size that never grow or shrink but can be allocated or freed dynamically;

Heaps, which are logical memory allocations that can be resized explicitly by the user (directly and indirectly); by an optimization algorithm; or may change in size as a results of variations in the workload, such as a spike in new connections or new tasks requested;

Volatile heaps, which are logical memory allocations that have no fixed size and grow each time memory is requested.

With respect to implementations of the invention, all enabled applications and/or application components are allocated memory heaps to enable dynamic memory balancing and optimization.

In the implementation shown in FIG. 2, each enabled application (only one, database manager 108, is shown) includes a plurality of memory consumers 202 that are application components. As explained above, the respective memory consumers 202 optionally provide callback functions 210–216. The MBOS 219 communicates with respective callback functions 210–216 to dynamically balance and optimize memory usage. The communications are accomplished using memory usage information or request messages 210A, 212A, 214A and 216A sent by the respective memory consumers 202 to the MBOS 219 via the API 218. The MBOS 219 in turn communicates with the callback functions 210, 212, 214 and 216 using callback instruction and request messages 210B, 212B, 214B and 216B to dynamically control memory usage by the respective memory consumers 202. Each time a message 210A–216A is received from a memory consumer 202, a corresponding one of a heap descriptor file (sort heap descriptors 220, load heap descriptors 224, buffer-pool heap 1 descriptors 228 and buffer-pool heap 2 descriptors 232) are updated to permit MBOS 219 to track memory usage by the respective memory consumers 202.

In the implementation shown in FIG. 2, the MBOS 219 is instantiated within the application, database manager 108. As will be explained below with reference to FIGS. 3–5, several other exemplary implementations are likewise possible. As will also be explained with reference to FIGS. 6–8, memory management algorithms in the MBOS function to balance and optimize memory consumption by memory consumers enabled in accordance with the invention.

Figure 3:
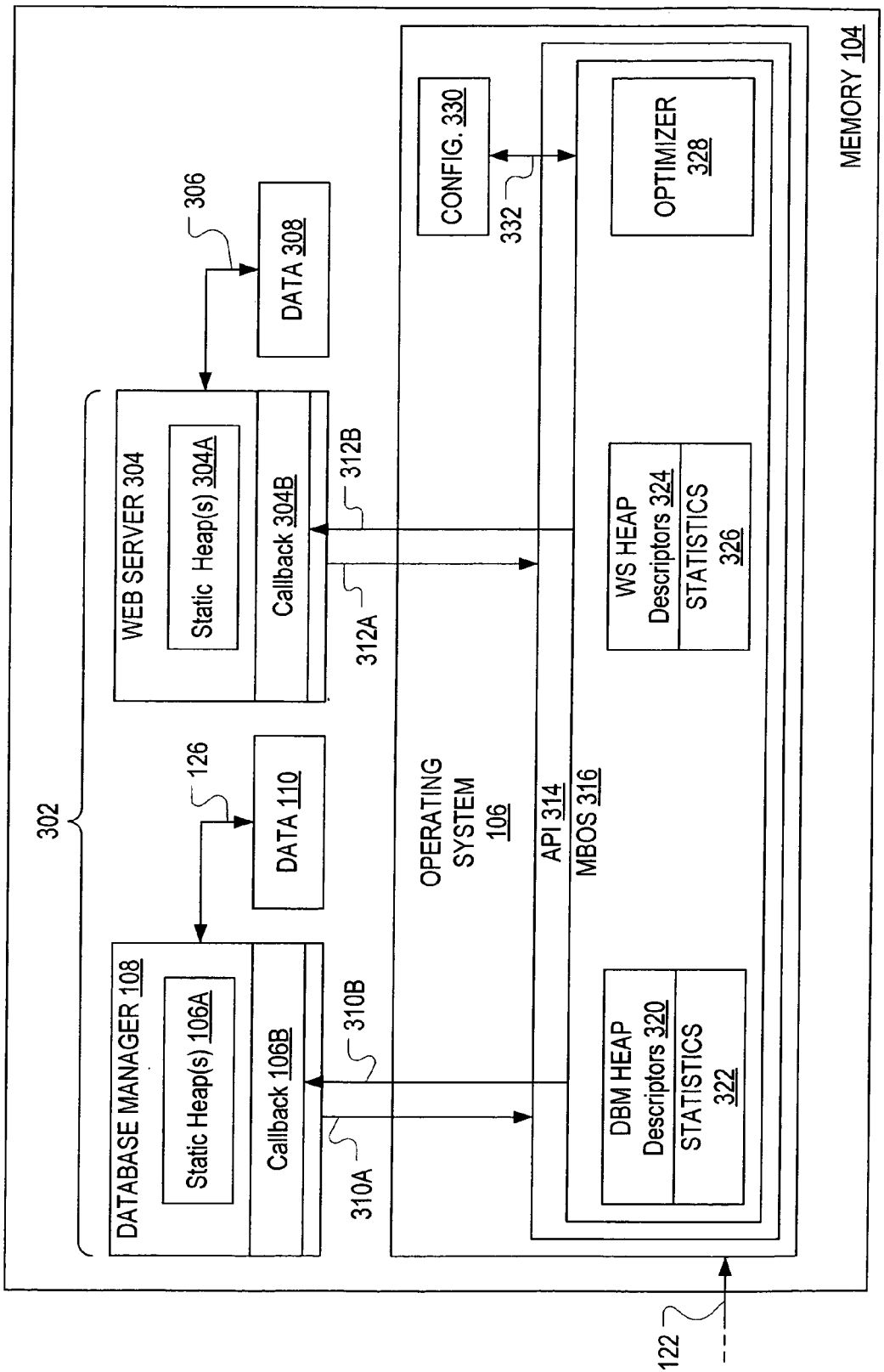
FIG. 3 is a block diagram of another embodiment of the invention.

FIG. 3 shows another implementation the MBOS in accordance with the invention. In this embodiment, an MBOS 316 with an API 314 is instantiated in an operating system 106 of the computer system 102 (FIG. 1). A plurality of memory consumers 302 include respective applications, only two of which are shown, i.e. database manager 108 and webserver 304, which are enabled with respective callback functions 106B and 304B. The applications maintain classic memory use structures, such as static heaps 106A and 304A. MBOS 316 maintains heap descriptors 320, 324 for the respective applications 106, 304. The applications 106, 304 send memory management information and request messages 310A to the API 314 and MBOS 316 returns memory management instructions to the respective callback functions 106B, 304B. This implementation of the invention functions in accordance with the same principles as described above with reference to FIG. 2. The MBOS 316 has less flexibility of control, because it only has awareness of the global memory usage by the respective memory consumers 302, and has no knowledge of memory usage by their respective application components. Memory balancing and optimization is achieved using function calls sent by MBOS 316 to the respective callback functions, as will be explained below in more detail. For example, although the classical implementation of static heaps permits less fine-tuned control of memory usage, MBOS 316 can redistribute memory to the respective applications as required by receiving information from callback functions 106B, 304B respecting static heap releases and requests for memory block allocations to permit new static heap instantiations.

Users can also exercise control over memory usage using configuration parameters 330 which are communicated via the API 314 to MBOS 316 using configuration change messages 332. User configuration changes are implemented by MBOS 316 using algorithms that will be explained below with reference to FIGS. 6–8.

Figure 4:
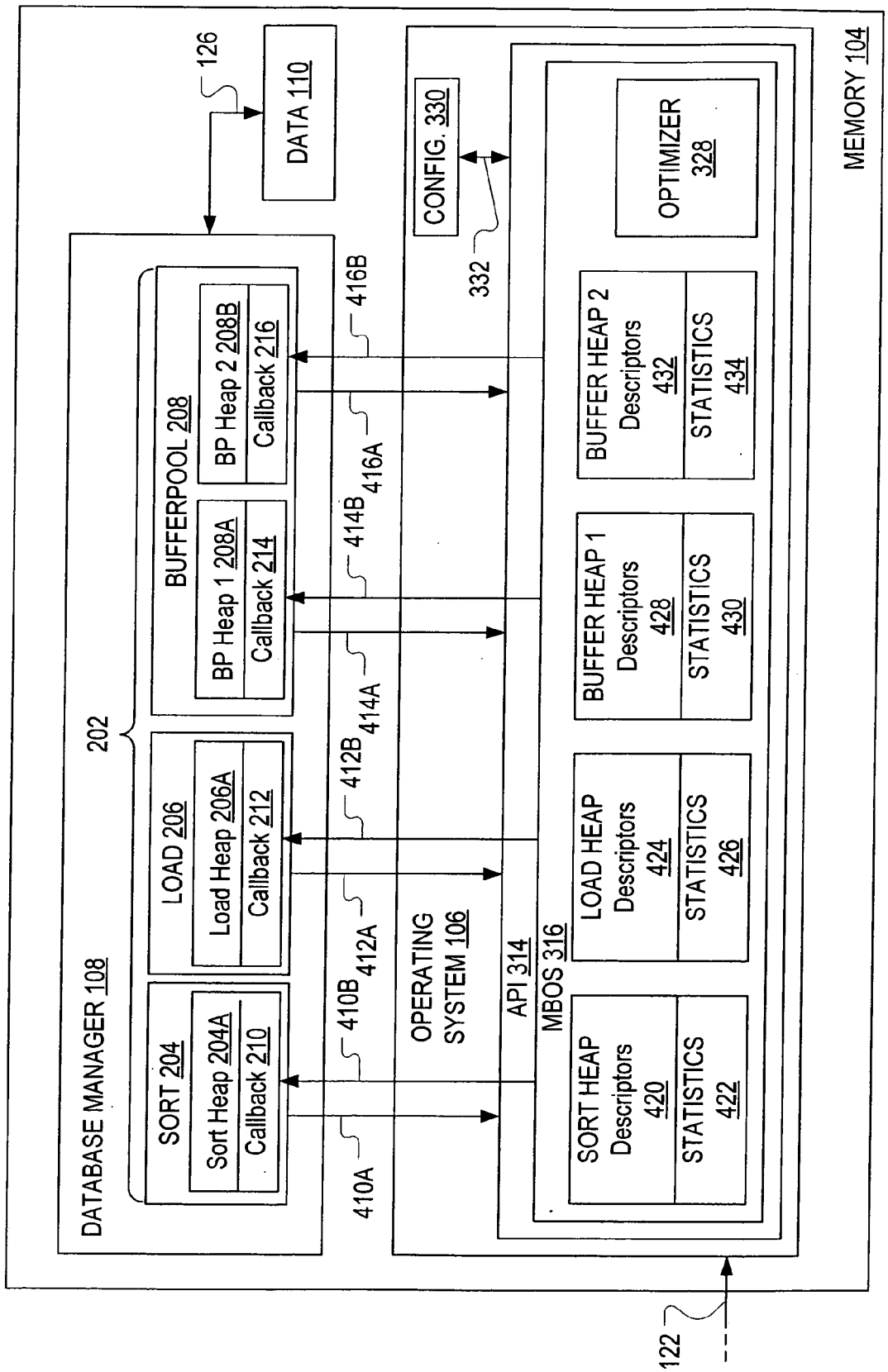
FIG. 4 is a block diagram of another embodiment of the invention.

FIG. 4 shows yet another implementation of the memory balancing and optimization services in accordance with the invention. This implementation provides the most powerful and flexible implementation, because it permits competition between memory consumers across a single, level plane enabled by an MBOS 316 instantiated within the operating system 106. In this implementation, the application components of each enabled application (only one, database manager 108, is shown) are enabled with callback functions 210, 212, 214 and 216, respectively. The respective application components (sort 204, load 206 and buffer-pool 208) are memory consumers 202, as explained above with reference to FIG. 2. The MBOS 316 in this implementation maintains a heap descriptor file for each of the respective application components. In this example, the descriptor files (only four of which are illustrated for convenience) include sort heap descriptors 420, load heap descriptors 424, buffer-pool heap 1 descriptors 428 and buffer-pool heap 2 descriptors 432. Optionally, the MBOS 316 is also enabled with algorithms for computing statistical analyses of memory usage by the respective memory consumers 202. The results of the statistical analysis are stored in respective statistics files 422, 426, 430 and 434. The MBOS 316 may likewise include an optimizer function 328 which, as described above, examines the respective heap descriptor files and/or statistics files and executes algorithms to solve, for example, the classical knapsack problem to optimize memory usage. Each memory consumer sends information and request messages 410A–416A through API 314 to MBOS 316. MBOS 316 sends control messages 410B–416B through API 314 to callback functions 210–216, as explained above.

Figure 5:
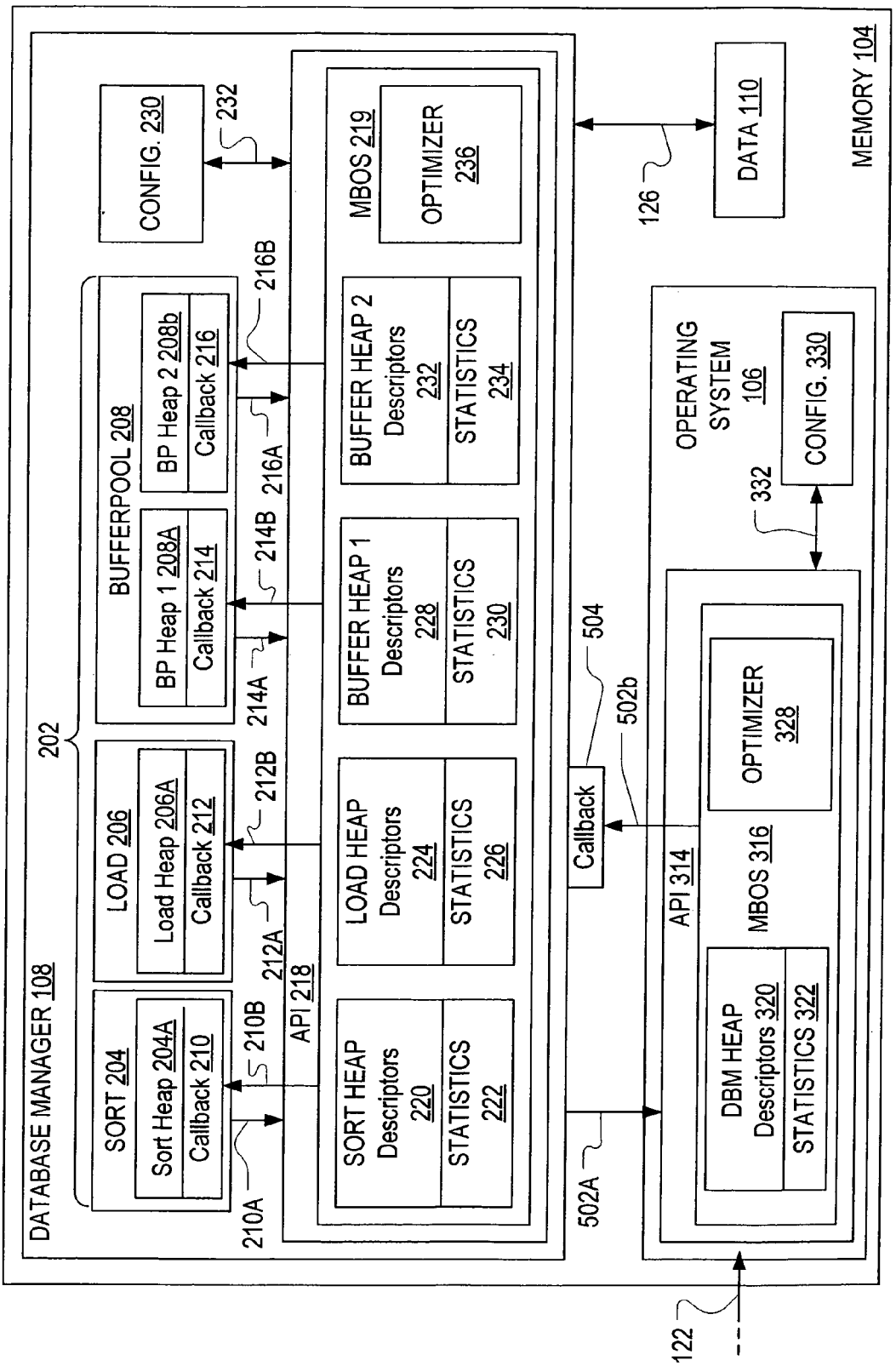
FIG. 5 is a block diagram of another embodiment of the invention.

FIG. 5 illustrates yet another implementation of the memory balancing and optimization services in accordance with the invention. In this implementation, each enabled application is configured as described above with reference to FIG. 2, with an instantiation of MBOS 219 with API 218. The components and functionality of the application-embedded memory balancing and optimization services are the same as described above with reference to FIG. 2. In addition, the database manager application 108 is provided with an application-embedded callback function 504 adapted to receive messages 502B from an MBOS 316 instantiated in the operating system 106 of the computer system 102. The database manager application 108 is also adapted to report memory usage using information and request messages 502A sent via API 314 to the MBOS 316. The MBOS 316 maintains a database manager heap descriptors file 320, which provides the MBOS 316 with a global view of memory usage by the database manager application 108. The MBOS 316 also optionally maintains statistics 322 derived from statistical analyses of memory usage by the database manager application 108.

The implementation of the memory balancing and optimization services shown in FIG. 5 permits dual level control of memory usage. The instantiation of MBOS 219 in the database manager 108 optimizes memory usage among the memory consumers 202, while the instantiation of MBOS 316 enables optimization from a global perspective of memory usage among various applications executing on the computer system 102.

The principal algorithms required to implement the memory balancing and optimization services in accordance with the invention will now be explained with reference to FIGS. 6–8.

Figure 6:
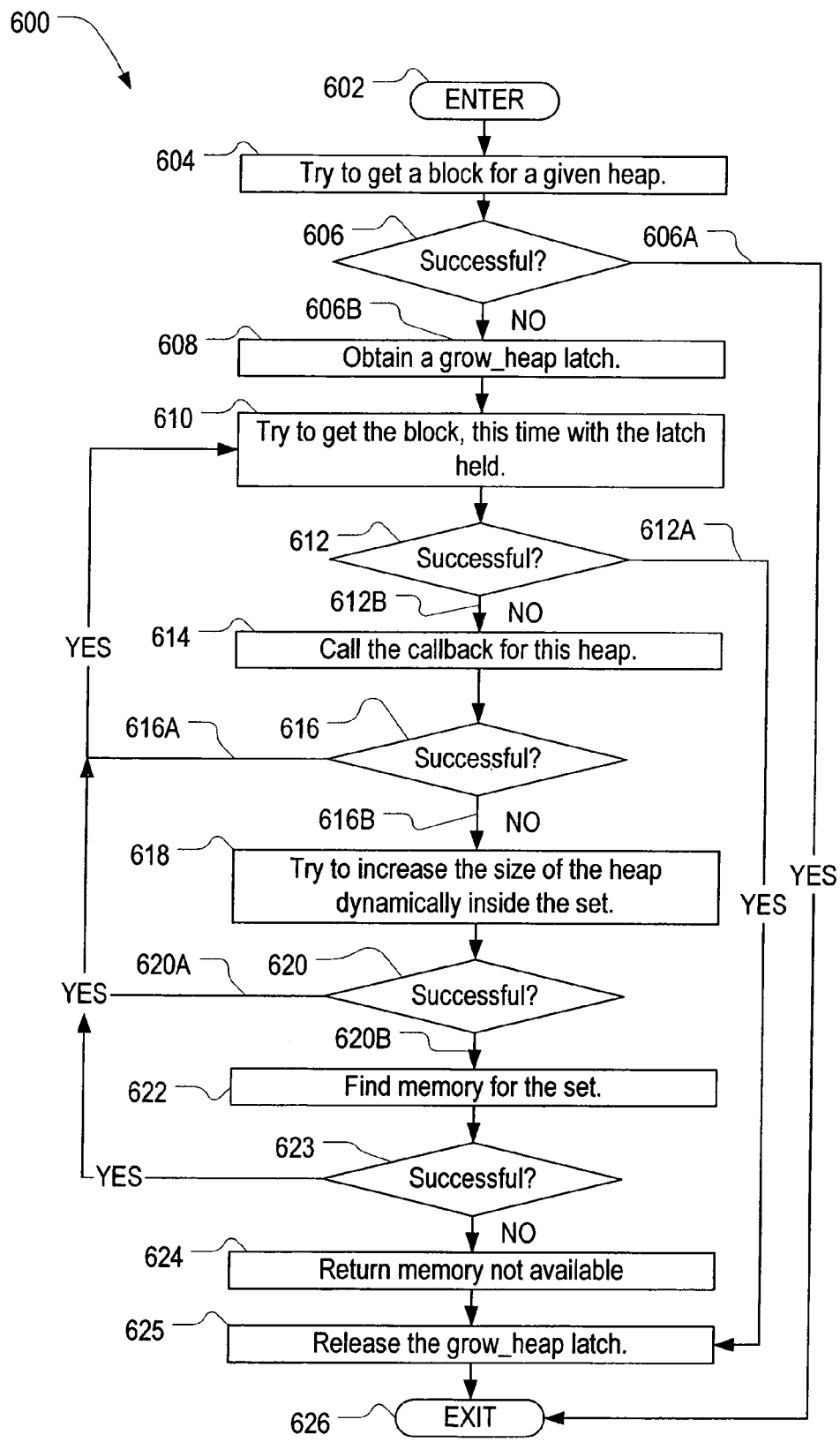
FIG. 6 is a flowchart of a method of the invention.

FIG. 6 is a flow chart illustrating actions of the MBOS 219, 314, 316 when a request is received from a memory consumer 202, 302 for an additional block of memory. Execution of the algorithm commences at 602 when the memory allocation request is received. The MBOS attempts to get a block of memory for the requesting heap (step 604) by issuing a request to the operating system 106 for a free block of memory using known methods that are instantiated in different ways in different operating systems, but are known in the art. If the attempt is determined to be successful (step 606) the algorithm routes (606A) to the exit 626. Otherwise, MBOS obtains a grow_heap latch by setting a corresponding parameter in the memory consumer's heap descriptor file. The grow_heap latch prevents a subsequent request for modifying memory allocations to the same memory heap until the instant request has been processed and the latch is released. After the grow_heap latch is obtained, MBOS attempts once again to get the requested block of memory using the mechanisms described above. The second attempt is made on the assumption that, for example, memory may have been released by another memory user in the interim since the first attempt to get the memory block in step 604. In step 612, it is determined whether the second attempt to obtain a block of memory was successful. If it was successful, the program branches (612A) to step 625 where the grow_heap latch is released and the algorithm exits at 626. If unsuccessful, the algorithm proceeds at 612B to step 614 where the MBOS issues a message to the callback function of the heap, requesting that the callback function examine memory uses to ensure that there are no unused memory blocks in the memory already allocated to the application. As is well known in the art, some memory consumers will request memory even though unused memory, or stale memory, is available to the memory consumer.

Consequently, the call to the callback function performed in step 614 requests that the callback function examine memory usage to determine whether a block of free memory is actually available. If the callback is successful (616A), the algorithm branches to step 610 and tries to get the block of memory with the latch held, and exits through 625 and 626 as explained above. If unsuccessful (616B), the MBOS attempts to increase a size of the heap dynamically within a set of which the memory consumer is a member (step 618). The set is a predefined collection of memory consumers. The definition of the set is a matter of application architecture, and is chosen by the designers of the application. The MBOS obtains knowledge of the set to which the memory consumer belongs by examining corresponding heap descriptors. The algorithm for increasing the size of the heap dynamically within the set will be explained below with reference to FIG. 7.

If it is determined in step 620 that the operation of increasing memory from within the set is successful, the algorithm branches (620A) to steps 610, 612, 625 and exits through 626. If it is not successful, the MBOS attempts to find memory for the set (step 622). Finding memory for the set is performed in one of a number of ways known by those skilled in the art, depending on the operating system 106 with which the MBOS is implemented. Memory for the set is allocated from system memory resources using memory allocation algorithms known in the art. If the attempt to obtain memory for the set is determined to be successful (step 623), the algorithm branches back to steps 610, 612, 625 and exits at 626. If it is not successful, the MBOS returns a MEMORY NOT AVAILABLE message (step 624) to the callback function, and the application or application component responds to the message in accordance with internal procedures implemented when memory is constrained. The algorithm then proceeds to step 625 where the grow_heap latch is released, and exits at 626.

Figure 7:
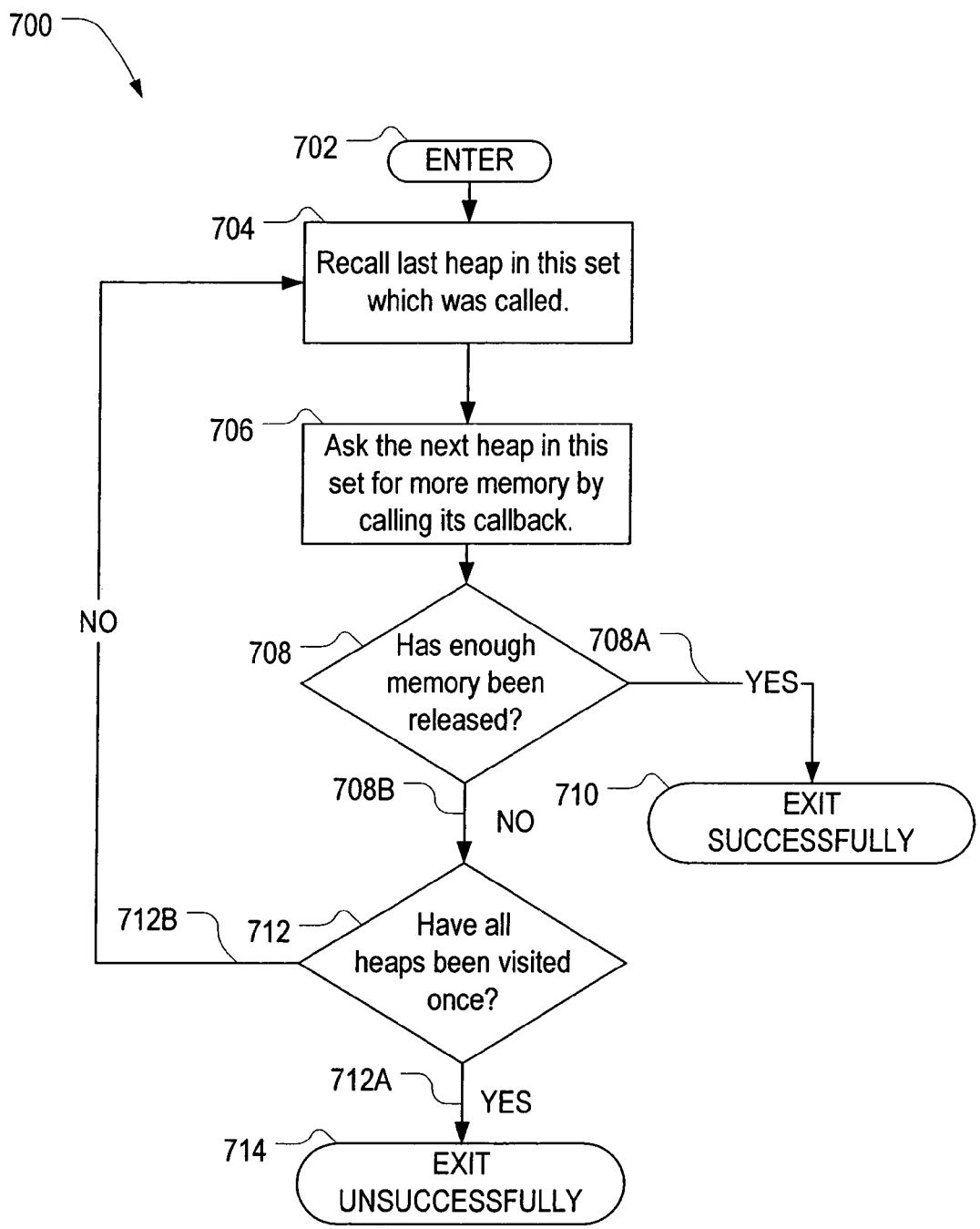
FIG. 7 is a flowchart of a method of the invention.

FIG. 7 is a flow chart schematically illustrating an algorithm for obtaining memory within the set of memory consumers referred to above with reference to step 618. When MBOS attempts to dynamically increase the size of a heap from within a set, it calls a function that commences (702) by examining an internal parameter that indicates the last heap in the set that was called for the memory balancing function. A request is then formulated and sent (step 706) to the callback function of the next heap in the set to request that the callback function examine memory usage to determine whether memory can be released from the heap. After a response is received from the callback function, it is determined in step 708 whether enough memory has been released to meet the outstanding requirement. If so (708A), the algorithm exits successfully (710). If not (708B), it is determined whether all of the callback functions for the respective heaps have been visited once (step 712). If not (712B), the algorithm branches back to step 704 and the process recommences with the next heap in the set. When all heaps have been visited once (712A), the algorithm exits successfully (714), regardless of whether enough memory has been released to meet the requirement.

Figure 8:
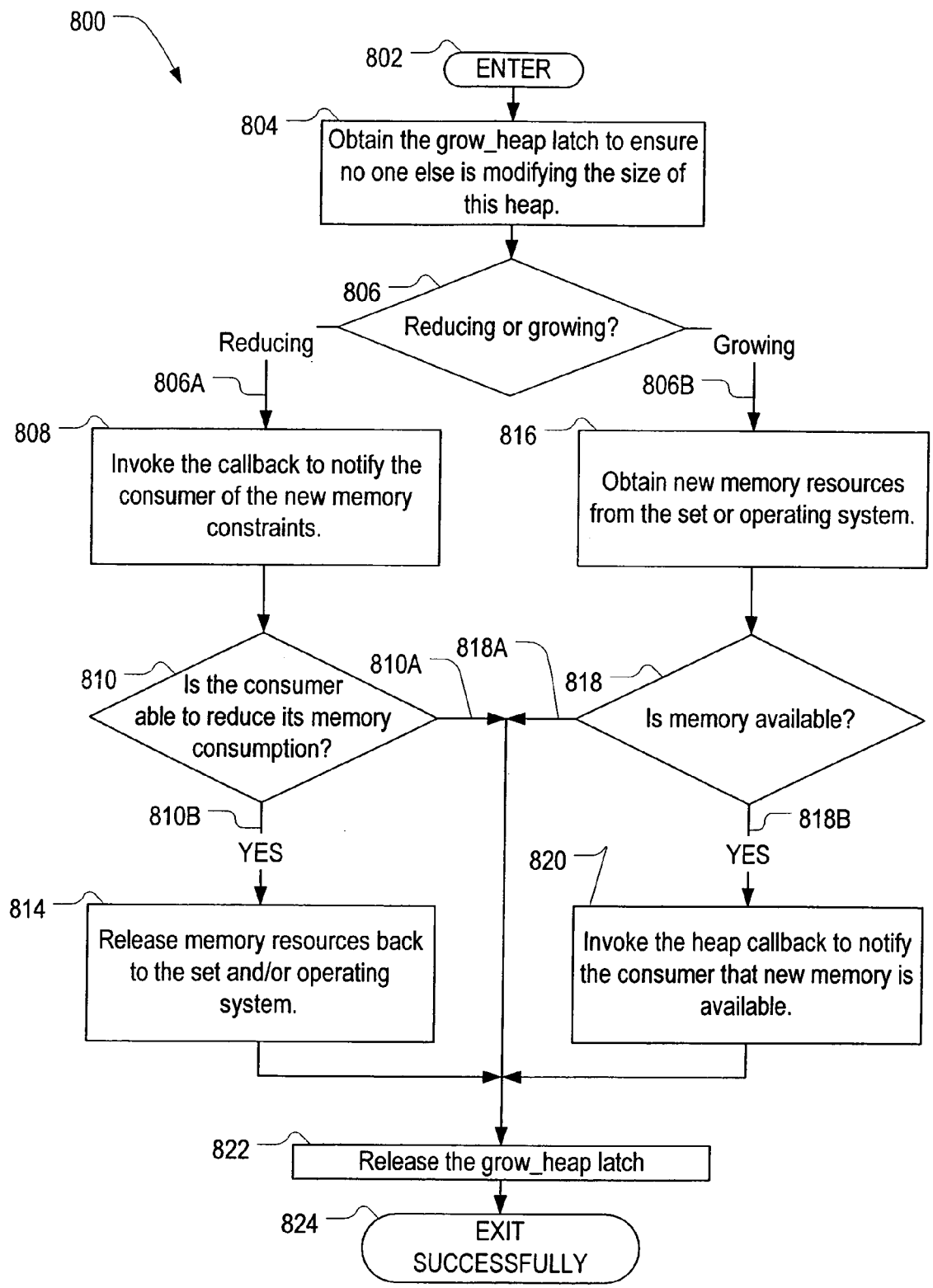
FIG. 8 is a flowchart of a method of the invention.

FIG. 8 is a flow chart that illustrates the actions of MBOS 219, 314 and 316 when a user or an optimization algorithm such as optimizer 236, 328 determines that one or more memory usage allocations should be changed. When MBOS receives a memory usage allocation change request (802), MBOS responds by obtaining the grow_heap latch to ensure that no other process is modifying the size of the affected heap (step 804). In step 806, it is determined whether the memory allocation is being reduced or increased. If the memory allocation is being reduced (806A), the MBOS dispatches a message (step 808) to the callback of the respective memory consumer to notify the memory consumer of the new memory constraints. MBOS then waits for a response to determine whether the memory consumer is able to reduce its memory consumption (step 810). If not (810A), the MBOS releases the grow_heap latch (step 822) and exits successfully (step 824). After exit, a message (not shown) is returned to the requester using known mechanisms to indicate that the memory re-allocation cannot be effected. If, however, the memory consumer indicates in step 810 that it has reduced its memory consumption, MBOS proceeds (810B) to release the memory resources back to the set and/or the operating system (step 814).

f in step 806 it is determined that memory allocation is being increased, MBOS proceeds (806B) to step 816 where it attempts to obtain new memory resources from the set or the operating system. It is determined in step 818 whether the required memory is available. If not (818A), the grow_heap latch is released in step 822 and the algorithm exits successfully in step 824. If the memory is available (818B), MBOS formulates and sends a message (step 820) to the callback function to notify the memory consumer that new memory is available. The memory consumer then performs the necessary reconfiguration of memory resources using methods known in the art. Thereafter, MBOS releases the grow heap latch (step 822) and exits successfully (step 824).

The invention therefore provides a memory balancing and optimization system that can be implemented in a variety of ways to improve memory balance and ensure optimal memory usage. The implementations of the system described above provide only four examples of potential implementation configurations. As will be appreciated by persons skilled in the art, other variations of the implementations are possible and contemplated within the scope of the invention.

The scope of the invention is therefore intended to be limited solely by the scope of the appended claims.

What is claimed is:

1. A system for balancing and optimizing memory allocation in a computer system that supports a plurality of memory consumers, comprising:
    a centralized control function within an application and adapted to serve memory reconfiguration requests from any one of: selected ones of the memory consumers, a memory optimizer, and a system administrator, wherein the centralized control function manages a plurality of coexisting memory heaps in use by the memory consumers in the form of application components of the application; and
    callback functions associated with each of the selected ones of the memory consumers, the callback functions being adapted to increase or reduce memory usage by one of the selected ones of the memory consumers under control of the centralized control function.

2. A computer system having a system memory, an operating system that executes within the system memory and a plurality of memory consumers that compete for use of the system memory, comprising:
    a callback function associated with respective coexisting memory heaps used by at least selected ones of the memory consumers; and
    a memory balancing and optimization service (MBOS) within an application that includes an application program interface (API) for accepting memory usage information and memory allocation request messages, the MBOS being adapted to send memory configuration messages to the respective callback functions to control a size of the respective coexisting memory heaps in use by the selected ones of the memory consumers in the form of application components of the application.

3. The computer system as claimed in claim 2 wherein the MBOS is adapted to receive the memory allocation request messages from the selected ones of the memory consumers, which send a memory allocation request message each time an associated memory heap used by the memory consumer requires re-sizing.

4. The computer system as claimed in claim 3 further comprising memory heap statistics maintained by the MBOS for each of the memory heaps, the memory heap statistics storing statistical analysis information about the associated memory heap.

5. The computer system as claimed in claim 2 wherein the MBOS is adapted to receive the memory allocation request messages from a system administrator, who sends a memory allocation request message to the MBOS in order to change a size of memory consumed by one or more of the selected ones of the memory consumers.

6. The computer system as claimed in claim 2 further comprising a memory optimizer adapted to determine a new memory configuration for memory used by the selected ones of the memory consumers, and further adapted to send the memory allocation request messages to the MBOS to request that the MBOS resize selected ones of the memory heaps to conform to the new memory configuration.

7. The computer system as claimed in claim 2 further comprising memory heap descriptors maintained by the MBOS for each of the memory heaps, the memory heap descriptors storing information about the associated memory heap.

8. The computer system as claimed in claim 2 wherein the MBOS is instantiated in an application that executes in the system memory, and the memory consumers are components of the application.

9. The computer system as claimed in claim 2 wherein the MBOS is instantiated in the operating system, and the memory consumers are applications that execute in the system memory.

10. The computer system as claimed in claim 2 wherein a first MBOS is instantiated in at least one application that executes in the system memory, and the memory consumers are components of the application; and a second MBOS is also instantiated in the operating system, and the memory consumers relative to the second MBOS is the at least one application that executes in the system memory.

11. A method of balancing and optimizing memory allocation in a computer system having an operating system, system memory and a plurality of memory consumers that compete for use of the system memory, comprising computer-implemented steps of:
    receiving a request from a memory consumer when a block of system memory is required, the request being received at an application programming interface (API) of a memory balancing and optimization service (MBOS) within an application, wherein the MBOS manages a plurality of coexisting memory heaps in use by the memory consumer in the form of application components of the application;
    issuing a request from the MBOS to the operating system to get the block of memory, and if the request is unsuccessful;
    issuing a request from the MBOS to a callback function associated with a memory heap in the plurality of coexisting memory heaps used by the memory consumer to get the block of memory; and
    if unsuccessful, issuing a request from the MBOS to respective callback functions of other memory consumers in a predefined set of memory consumers sharing a same memory space, to determine whether a memory block can be obtained from another member of the set.

12. A method as claimed in claim 11, wherein if the step of obtaining memory from another member of the set is unsuccessful, the method further comprises a step of issuing a request from the MBOS to obtain memory for the set from unallocated system memory.

13. A method as claimed in claim 11 wherein the step of determining whether a memory block can be obtained from another member of the predefined set comprises steps of:
    determining a last memory heap in the set to which a request for memory was sent;
    issuing the request to a callback function of a next memory heap in the set; and continuing to issue the requests to successive ones of the callback functions of memory heaps in the set until the block of memory has been found, or a request has been sent to the callback function of every memory heap in the set.

14. A method as claimed in claim 11 wherein the method further comprises steps of:
    collecting memory usage information related to the selected ones of the memory consumers;
    analyzing the memory usage information to determine an improved memory usage configuration; and
    instructing the respective callback functions to adjust memory usage in compliance with the improved memory usage configuration.

15. A computer-readable medium storing program instructions for:
    receiving a request from a memory consumer when a block of system memory is required, the request being received at an application programming interface (API) of a memory balancing and optimization service (MBOS) within an application, wherein the MBOS manages a plurality of coexisting memory heaps in use by the memory consumer in the form of application components of the application;
    issuing a request from the MBOS to the operating system to get the block of memory, and if the request is unsuccessful;
    issuing a request from the MBOS to a callback function associated with a memory heap in the plurality of coexisting memory heaps used by the memory consumer to get the block of memory; and
    if unsuccessful, issuing a request from the MBOS to respective callback functions of other memory consumers in a predefined set of memory consumers sharing a same memory space, to determine whether a memory block can be obtained from another member of the set.

16. A computer-readable medium as claimed in claim 15 wherein the instructions for determining whether a memory block can be obtained from another member of the predefined set further comprises program instructions for:
    determining a last memory heap in the set to which a request for memory was sent;
        issuing to request to a callback function of a next memory heap in the set; and
        continuing to issue the requests to successive ones of the callback functions of memory heaps in the set until the block of memory has been found, or a request has been sent to the callback function of every memory heap in the set.

17. A computer-readable medium as claimed in claim 15 further including program instructions for:
    collecting memory usage information related to the selected ones of the memory consumers;
    analyzing the memory usage information to determine an improved memory usage configuration; and
    instructing the respective callback function to adjust memory usage in compliance with the improved memory usage configuration.

18. A method of balancing and optimizing memory allocation in a computer system having an operating system, system memory and a plurality of memory consumers that compete for use of the system memory, comprising computer-implemented steps of:
    receiving at an application programming interface (API) of a memory balancing and optimization service (MBOS) within an application instructions to reconfigure memory usage by one of the memory consumers, wherein the MBOS manages a plurality of coexisting memory heaps in use by the memory consumer in the form of an application component of the application;
    obtaining a memory grow_heap latch associated with a memory heap used by the memory consumer;
    determining whether the memory is being reduced or increased; and
    instructing a callback function associated with the memory heap to release or add memory to the memory heap in accordance with the reconfiguration instructions.

19. A method as claimed in claim 18 wherein the step of receiving comprises a step of receiving the instructions from a user reconfiguration event.

20. A method as claimed in claim 18 wherein the step of receiving comprises a step of receiving the instructions from a memory usage optimization algorithm.

* * * * *